(No Model.)
S. M. COLE.
MEASURING PUMPS.
No. 270,021. Patented Jan. 2, 1883.
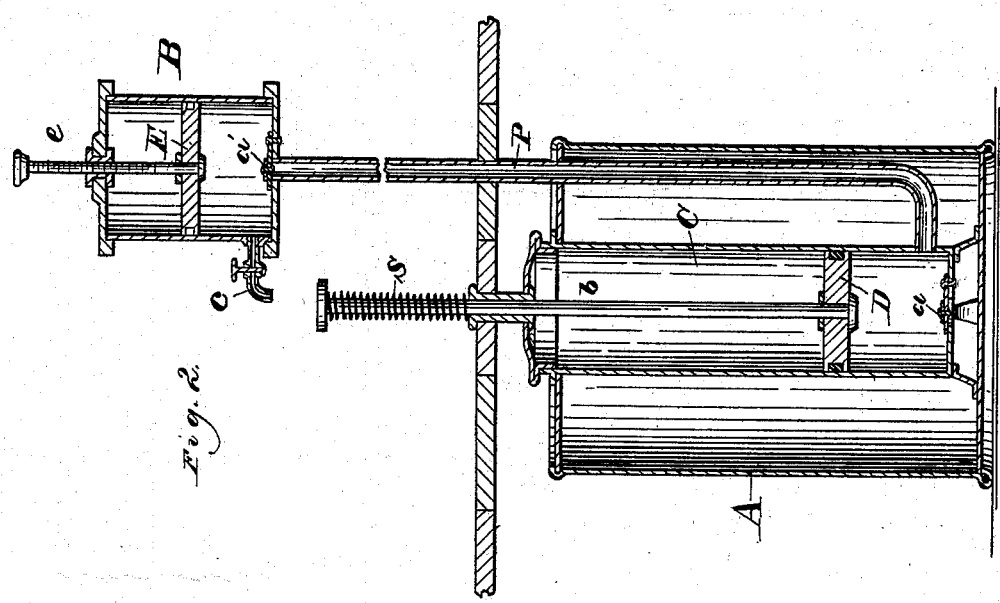
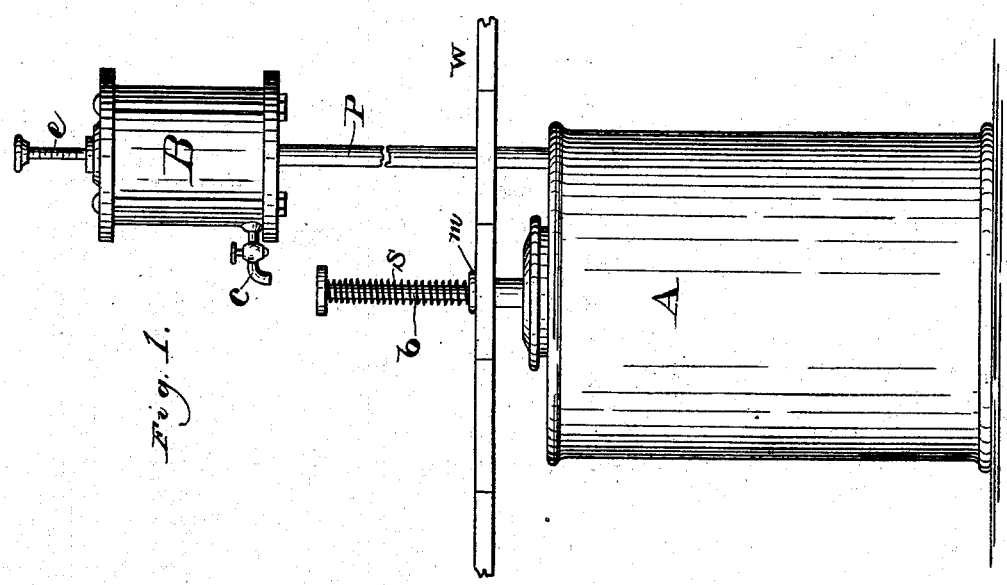
Witnesses.
Henry Frankfurter,
Frank Johnson
Inventor.
Shuman M. Cole
per.
H Harrison
Attorney.

UNITED STATES PATENT OFFICE.

SHUMAN M. COLE, OF ANAMOSA, IOWA.

MEASURING-PUMP.

SPECIFICATION forming part of Letters Patent No. 270,021, dated January 2, 1883.

Application filed May 4, 1882. (No model.)

*To all whom it may concern:*

Be it known that I, SHUMAN M. COLE, a citizen of the United States of America, residing at Anamosa, in the county of Jones and State of Iowa, have invented a new and useful Device for Elevating and Measuring Oils and Fluids, of which the following is a specification.

My invention relates to a device for elevating and measuring oils and other fluids; and the object of my improvement is to provide a device whereby oils and other fluids may be elevated and measured from a tank or vat in one operation. I attain this object by the construction, arrangement, and combination of the several parts as illustrated in the accompanying drawings, in which—

Figure 1 is a side elevation. Fig. 2 is a sectional elevation.

Similar letters of reference refer to similar parts throughout the several views.

A is a tank or vat containing the oil or fluid to be elevated and measured. It is placed directly beneath the floor $w$ or on it. A is made of any material of which tanks or vats are made.

C is a cylinder, made of metal or any suitable material. It rests inside of the tank A, on supports on the bottom of the tank, so that the bottom of the cylinder will be a short distance above the bottom of the tank. The cylinder extends up through the top of the tank, with its cover just above the tank, and provided with a neck or mouth through which the stem or piston-rod $b$ passes, and on which the spring S rests and has a bearing. At the bottom of the cylinder C is a valve, $a$, which opens upward into it.

D is the piston of the cylinder C, fitting close and snug to the sides of the cylinder. It is secured to the lower end of the piston rod or stem $b$. The piston-rod $b$ extends up through the mouth $m$ of the cylinder, having at its top a handle or foot-rest. Around the top end of the piston-rod $b$, and between its handle and the mouth or neck $m$ of the cylinder, is a spiral spring, S, having a bearing against the handle and the mouth, and is for the purpose of forcing the piston-rod up after being pushed down. The cylinder C is air-tight.

P is a pipe running from the lower side of the cylinder C to the bottom of the measuring-receptacle B, and connecting the same.

B is what I call my "measuring-receptacle," situated above the tank, and connected to the cylinder C by pipe P. B is made of glass or metal. If made of glass, it has a graduated scale on the outside to indicate the amount of oil or fluid drawn off or within. If made of metal, the graduated scale is on the stem $e$, as shown in Fig. 2 of the drawings.

$a'$ is a valve in the bottom of B, at its connection with pipe P. This valve opens upward or inward.

E is a piston or float in B on the lower end of the stem $e$, and fits snugly on the inside of B. The stem $e$ extends up through a vent in the top of B, and is provided with a graduated scale to indicate the quantity of oil or fluid drawn off from B. The stem $e$ and piston or float E move freely up and down in B. Near the bottom, at the side of B, is a faucet or cock, $c$, for the purpose of drawing off the oil or fluid from B.

The measuring-receptacle B may be round, square, or any desired shape, being air-tight, with the exception of a vent or opening in the top for the free movement of the stem $e$. The connecting-pipe P is of metal or any other suitable material.

All the several parts are arranged as shown in the drawings.

The manner of operation is as follows: It being desired to measure and draw off some of the oil or other fluid in the tank A, the piston D being near the bottom of the cylinder C, having been pushed there by the operator by means of a foot-pedal or hand-lever on the end of $b$, the operator releasing the pressure, the spring S, which had been compressed, will force the stem $b$ up, carrying the piston D, and thereby creating a vacuum in the cylinder C; or a cord and weight may be on the end of the stem $b$ in place of the spring S. A vacuum having been created in C, the valve $a$ will open and the oil will pass from A into C. Now, upon the operator pushing down the stem $b$, the valve $a$ will close and the oil in C will be forced through pipe P into B, the valve $a'$ opening to allow it to flow into B. The oil flowing into B will force up the piston or float E to the top until the measuring-receptacle B is filled. The piston or float E will stop the vent around the spindle $e$, thereby stopping all possibility of more than a certain quantity being forced into B, and also preventing any slopping over of any oil, as is the case with other measures now in use. B having been filled, the valve $a'$ will close. The party desiring to draw off any quantity places the can or pan under the faucet or cock $c$ and opens the same, when the oil will flow out. If B is of glass, the amount will be indicated by the graduated scale on B. If of metal, the same will be indicated by the graduated scale on $e$. As the oil is drawn off the float E will drop, keeping on top of the oil, and the piston $e$ will descend, indicating the loss of oil by being drawn off, or what is remaining in B. The operation thus described can be repeated as often as desired.

Having described my invention, what I claim as new, and desire to secure by Letters Patent, is—

1. In a device for elevating and measuring oils and other fluids, the combination, with the tank A, having perforated cover, of the cylinder C, resting on supports in said receptacle, and having extended tubular neck, and provided with valve $a$, and piston D, having rod $b$, provided with spring S, said spring being held between the flanged neck of cylinder C and foot-rest of piston-rod $b$, substantially as shown and described.

2. In a device for elevating and measuring oils and other fluids, the combination of the tank A, having cylinder C, provided with valve $a$, piston D, provided with spring-rod $b$, working in tubular collar of said chamber C, and the connecting-pipe P, with the measuring-receptacle B, provided with perforated cover, and having valve $a'$, faucet $c$, and float E, having graduated standard $e$, passing through perforation in cover of said receptacle B, substantially as shown and described.

3. In a device for elevating and measuring oils and other fluids, the combination, with the tank A, having perforated cover, the cylinder C, supported in said tank, and having valve $a$, piston D, provided with rod $b$, having spring S wound around its upper end, and tubular neck, forming guide for said piston-rod, of the measuring-receptacle B, having valve $a'$ in its bottom, piston or float E, suitable devices for measuring its contents, and discharge-faucet $c$, and the pipe P, connecting cylinder C and measuring-receptacle B, all substantially as shown and described.

In testimony whereof I affix my signature in presence of two witnesses.

SHUMAN M. COLE.

Witnesses:
 JOHN B. McQUEEN,
 J. H. CHAPMAN.

It is hereby certified that the name of the patentee of Letters Patent No. 270,021, granted January 2, 1883, for an improvement in "Measuring Pumps," should have been read and printed "Sherman M. Cole" instead of "Shuman M. Cole;" and that the said letters patent should be read with this correction therein to make the same conform to the record of the case in the Patent Office.

Signed, countersigned, and sealed this 26th day of June, A. D. 1883.

[SEAL.]

M. L. JOSLYN,
*Acting Secretary of the Interior.*

Countersigned:

E. M. MARBLE,
*Commissioner of Patents.*